United States Patent [19]
Yamaoka et al.

[11] Patent Number: 6,025,958
[45] Date of Patent: Feb. 15, 2000

[54] LAMINATED WAVELENGTH PLATE, CIRCULAR POLARIZING PLATE AND LIQUID CRYSTAL DISPLAY

[75] Inventors: Takashi Yamaoka; Hiroyuki Yoshimi; Yasuo Fujimura, all of Osaka, Japan

[73] Assignee: Nitto Denko Corporation, Osaka, Japan

[21] Appl. No.: 09/186,093

[22] Filed: Nov. 5, 1998

[30] Foreign Application Priority Data

Nov. 14, 1997 [JP] Japan ..................................... 9-331074

[51] Int. Cl.$^7$ ...................................................... G02B 5/30
[52] U.S. Cl. ................................. 359/494; 349/5; 359/584
[58] Field of Search ................................. 359/494, 584; 349/5

[56] References Cited

U.S. PATENT DOCUMENTS

| | | | |
|---|---|---|---|
| 5,699,188 | 12/1997 | Gilbert et al. | 359/584 |
| 5,875,008 | 2/1999 | Takahara et al. | 349/5 |

FOREIGN PATENT DOCUMENTS

| | | | |
|---|---|---|---|
| 405100114 | 10/1991 | Japan | 359/494 |
| 5-100114 | 4/1993 | Japan . | |

*Primary Examiner*—Cassandra Spyrou
*Assistant Examiner*—Craig Curtis
*Attorney, Agent, or Firm*—Whitham, Curtis & Whitham

[57] ABSTRACT

A wavelength plate which shows little undesirable retardation in a specific wavelength range while substantially maintaining the function of ½ wavelength plate or ¼ wavelength plate over the entire visible light range and a circular polarizing plate which shows little reflection at the interface and exhibits an anti-reflection effect over a wide wavelength range and an excellent thermal stability. A laminated wavelength plate comprising a plurality of oriented films giving a retardation having a wavelength half that of monochromatic light laminated with their optical axes crossing each other, wherein the dependence of the birefringence differences $\Delta n_1$ and $\Delta n_2$ of said oriented films on wavelength each satisfy the relationship $\Delta n_1/\Delta n_2 < 1.05$ based on light having wavelength of 400 nm ($\Delta n_1$) and 550 nm ($\Delta n_2$), a laminated wavelength plate comprising a plurality of oriented films laminated with their optical axes crossing each other, the dependence of the birefringence differences $\Delta n_1$ and $\Delta n_2$ of said oriented films on wavelength each satisfying the relationship $\Delta n_1/\Delta n_2 < 1.05$ based on light having wavelength of 400 nm ($\Delta n_1$) and 550 nm ($\Delta n_2$), wherein the oriented films used are those giving a retardation of ½ wavelength with respect to monochromatic light and those giving a retardation of ¼ wavelength with respect to monochromatic light in combination, a circular polarizing plate comprising a laminate of the the laminated wavelength plate having a ¼ wavelength plate and a polarizing plate, and a liquid crystal display comprising the circular polarizing plate.

13 Claims, 3 Drawing Sheets

LAMINATED WAVELENGTH PLATE, CIRCULAR POLARIZING PLATE AND LIQUID CRYSTAL DISPLAY

FIELD OF THE INVENTION

The present invention relates to a laminated wavelength plate which gives a predetermined retardation of ½ wavelength, ¼ wavelength or the like over a wide wavelength range, a circular polarizing plate having an excellent durability which prevents reflection over a wide wavelength range, and a liquid crystal display having an excellent visual perceptibity.

BACKGROUND OF THE INVENTION

A ½ wavelength plate or ¼ wavelength plate made of a single sheet of oriented film has heretofore been known. However, such a wavelength plate is disadvantageous in that its retardation differs from wavelength to wavelength, restricting the wavelength at which it can act as a ½ wavelength plate or ¼ wavelength plate to a specific value. In other words, a wavelength plate which acts as a ¼ wavelength plate with respect to light having a wavelength of 550 nm cannot act as a ¼ wavelength plate with respect to light having a wavelength of 450 nm or 650 nm. Therefore, when a circular polarizing plate obtained by bonding such a ¼ wavelength plate to a polarizing plate is used as an anti-reflection filter for preventing reflection from the surface of display or the like, it cannot exert a sufficient anti-reflection effect with respect to light having a wavelength which is not 550 nm, particularly with respect to blue-based light. In this case, the display or the like looks blue.

In this respect, the present inventors earlier proposed a laminated wavelength plate comprising a plurality of oriented films giving a ½ wavelength or 114 wavelength laminated with their optical axes crossing each other (JP-A-5-100114 (The term "JP-A" as used herein means an "unexamined published Japanese patent application")). In accordance with this laminated wavelength plate, a predetermined phase difference such as ½ wavelength and ¼ wavelength can be given over a wide wavelength range. However, it was found that such a laminated wavelength plate gives an undesirable retardation in a specific wavelength range. It was also found that a circular polarizing plate made of such a laminated wavelength plate shows too great a reflection at the interface of layers to exhibit sufficient light shielding properties or undergoes a partial retardation change due to heat to give ununiform visual perceptibility.

SUMMARY OF THE INVENTION

It is therefore an object of the present invention to provide a wavelength plate which shows little undesirable retardation in a specific wavelength range while substantially maintaining the function of ½ wavelength plate or ¼ wavelength plate over the entire visible light range and a circular polarizing plate which shows little reflection at the interface and exhibits an anti-reflection effect over a wide wavelength range and an excellent thermal stability.

The above object of the present invention will become more apparent from the following detailed description and examples.

The present invention provides a laminated wavelength plate comprising a plurality of oriented films giving a retardation having a wavelength half that of monochromatic light laminated with their optical axes crossing each other, wherein the dependence of the birefringence differences $\Delta n_1$ and $\Delta n_2$ of the oriented films on wavelength each satisfy the relationship $\Delta n_1/\Delta n_2 < 1.05$ based on light having wavelength of 400 nm ($\Delta n_1$) and 550 nm ($\Delta n_2$), a laminated wavelength plate comprising a plurality of oriented films laminated with their optical axes crossing each other, the dependence of the birefringence differences $\Delta n_1$ and $\Delta n_2$ of said oriented films on wavelength each satisfying the relationship $\Delta n_1/\Delta n_2 < 1.05$ based on light having wavelength of 400 nm ($\Delta n_1$) and 550 nm ($\Delta n_2$), wherein oriented film used are those giving a retardant of ½ wavelength with respect to monochromatic light and those giving a retardation of ¼ wavelength with respect to monochromatic light in combination, a circular polarizing plate comprising a laminate of the laminated wavelength plate having a ¼ wavelength plate and a polarizing plate, and a liquid crystal display device comprising the circular polarizing plate.

By laminating a plurality of oriented films giving a retardataion of ½ wavelength or ¼ wavelength with respect to monochromatic light with their optical axes crossing each other, the wavelength dispersion of retardation defined by the product ($\Delta$nd) of the birefringence difference ($\Delta$n) and the thickness (d) can be arbitrarily controlled, i.e., increased or decreased, making it possible to suppress the wavelength dispersion while controlling the entire phase difference to a predetermined value. Thus, a ½ wavelength plate or ¼ wavelength plate which exhibits a predetermined phase difference over a wide wavelength range such as entire visible light range can be obtained.

In this respect, the use of an oriented film the dependence of the birefringence differences $\Delta n_1$ and $\Delta n_2$ of which satisfies the relationship $\Delta n_1/\Delta n_2 < 1.05$ based on light having wavelength of 400 nm ($\Delta n_1$) and 550 nm ($\Delta n_2$) makes it possible to obtain a wavelength plate which exhibits little undesirable retardation in a specific wavelength range but a desired retardation in a wide wavelength range such as visible light range. The use of a wavelength plate giving a retardation having a wavelength of ¼ that of the wavelength plate makes it possible to obtain a circular polarizing plate useful, e.g., as wide range anti-reflection filter which can substantially inhibit the reflection of light in the visible range or the like. Further, by bonding a plurality of these wavelength plates with an adhesive layer having a refractive index difference of not more than 0.1 from that of these wavelength plates provided interposed therebetween, a circular polarizing plate which shows little reflection at the interface and exhibits an anti-reflection effect over a wide wavelength range and an excellent thermal resistance and other resistances can be obtained.

BRIEF DESCRIPTION OF THE DRAWINGS

By way of example and to make the description more clear, reference is made to the accompanying drawings in which.

Figure 1:
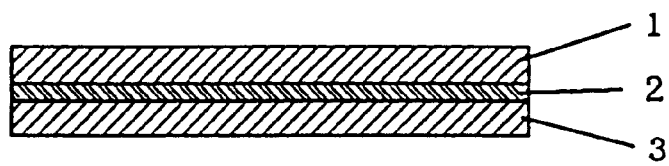
FIG. 1 is a sectional view illustrating an example of ½ wavelength plate.

In the drawings, 1 and 3 indicate an oriented film giving a retardation of ½ wavelength, 2 indicates an adhesive layer, 4 indicates an oriented film giving a retardation of ¼ wavelength, 5 indicates a polarizing plate, and 6 indicates a ¼ wavelength plate.

DETAILED DESCRIPTION OF THE INVENTION

The laminated wavelength plate according to the present invention comprises a plurality of oriented films giving a retardation having a wavelength half that of monochromatic light laminated with their optical axes crossing each other, wherein the dependence of the birefringence differences $\Delta n_1$ and $\Delta n_2$ of the oriented films on wavelength each satisfy the relationship $\Delta n_1/\Delta n_2 < 1.05$ based on light having wavelength of 400 nm ($\Delta n_1$) and 550 nm ($\Delta n_2$). An embodiment of the laminated wavelength plate according to the present invention is shown in FIG. 1. Shown each at the reference numerals 1 and 3 is an oriented film giving a retardation of ½ wavelength. Shown at the reference numeral 2 is a transparent adhesive layer. The laminated number of sheets of oriented films is arbitrary. In the light of light transmittance or the like, it is preferably from 2 to 5.

The angle of crossing of the optical axes of the various oriented films for the structure of ½ wavelength plate may be calculated by the following equation as a basic example. Supposing that the laminated number of sheets of oriented films is N and the angle of the polarizing direction of outcoming light transmitted by the wavelength plate from the polarizing direction of incident light as a reference (0°) is θ, the crossing angle $\theta_k$ of each of the various ½ wavelength films is determined by the equation:

$$\theta_k = (2K-1) \cdot \theta / 2N$$

wherein K is an integer of from 1 to N.

Figure 2:
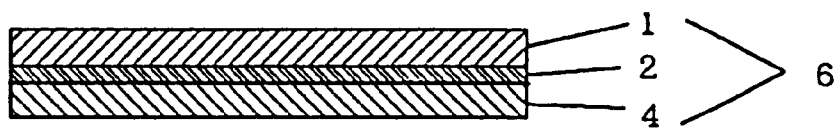
FIG. 2 is a sectional view illustrating an example of ¼ wavelength plate.

On the other hand, another embodiment of the laminated wavelength plate according to the present invention comprises a plurality of oriented films laminated with their optical axes crossing each other, the dependence of the birefringence differences $\Delta n_1$ and $\Delta n_2$ of said oriented films on wavelength each satisfying the relationship $\Delta n_1/\Delta n_2 < 1.05$ based on light having wavelength of 400 nm ($\Delta n_1$) and 550 nm (($\Delta n_2$), characterized in that the oriented films there used are those giving a retardation of ½ wavelength with respect to monochromatic light and those giving a retardation of ¼ wavelength with respect to monochromatic light in combination. An example of this laminated wavelength plate is shown in FIG. 2. Shown at the reference numeral 4 is an oriented film giving a retardation of ¼ wavelength.

In order to obtain a ¼ wavelength plate, the following requirements must be satisfied. In other words, an oriented film giving a retardation of ½ wavelength with respect to monochromatic light and an oriented film giving a retardation of ¼ wavelength with respect to monochromatic light must be used. Further, the dependence of the birefringence differences $\Delta n_1$ and $\Delta n_2$ of these oriented films on wavelength each must satisfy the relationship $\Delta n_1/\Delta n_2 < 1.05$ based on light having wavelength of 400 nm ($\Delta n_1$) and 550 nm ($\Delta n_2$). Moreover, these oriented films must be laminated with their optical axes crossing each other. In this case, the laminated number of sheets of oriented films is arbitrary. In the light of light transmittance, the laminated number of sheets of oriented films is normally from 2 to 5. The position of the oriented film giving a retardation of ½ wavelength with respect to monochromatic light and the oriented film giving a retardation of ¼ wavelength with respect to monochromatic light are arbitrary.

In this respect, with reference to the structure in which a sheet of an oriented film giving a retardation of ¼ wavelength is disposed on a laminated wavelength plate on the side thereof from which light comes out, the relationship between the angle of crossing of the optical axes of various oriented films and the direction (θ) of polarized light coming out from the various oriented films can be represented by the following equation. Supposing that the used number of oriented films giving a retardation of ½ wavelength is n (n-th oriented film is represented by λ/2(n)) and the laminating angle of λ/2(1, 2, . . . n) are $\theta_1, \theta_2, \ldots \theta_n$, Laminating angle = 2 $(\theta_1 + \theta_2 + \ldots + \theta_{n-1}) + \theta_n$ Direction of polarized light coming out from various λ/2 plates = 2 $(\theta_1 + \theta_2 + \ldots + \theta_n)$ By laminating an oriented film giving a retardation of ¼ wavelength on this structure at an angle of 45 degrees, circular polarization can be obtained.

The above relationship will be set forth in the table below with reference to the structure comprising three sheets of oriented films giving a retardation of ½ wavelength (λ/2 (1, 2, 3)). λ/4 indicates an oriented film giving a retardation of ¼ wavelength.

| | Laminating angle | Direction of polarized light coming out from wavelength plate |
|---|---|---|
| λ/2 (1) | $\theta_1$ | $2\theta_1$ |
| λ/2 (2) | $2\theta_1 + \theta_2$ | $2(\theta_1 + \theta_2)$ |
| λ/2 (3) | $2(\theta_1 + \theta_2) + \theta_3$ | $2(\theta_1 + \theta_2 + \theta_3)$ |
| λ/4 | $2(\theta_1 + \theta_2 + \theta_3) + 45$ | Circular polarization |

The oriented film giving a retardation of ½ wavelength or ¼ wavelength with respect to monochromatic light employable herein can be obtained, e.g., by orienting a high molecular film monoaxially, biaxially or in any other proper processes. The kind of the high molecular weight compound is not specifically limited. In practice, however, a high molecular weight compound having an excellent transparency is preferably used. Examples of such a high molecular weight compound include polycarbonate-based high molecular weight compounds, polyester-based high molecular weight compounds, polysulfone-based high molecular weight compounds, polyether sulfone-based high molecular weight compounds, polystyrene-based high molecular weight compounds, polyolefin-based high molecular weight compounds, polyvinyl alcohol-based high molecular weight compounds, cellulose acetate-based high molecular weight compounds, polyvinyl chloride-based high molecular weight compounds, polymethyl methacrylate-based high molecular weight compounds, polyacrylate-based high molecular -weight compounds, and polyamide-based high molecular weight compounds.

Particularly preferred among these high molecular weight compounds are polyolefin-based high molecular weight compounds, especially cyclic olefin-based high molecular weight compounds, cellulose acetate-based high molecular weight compounds, and polymethyl methacrylate-based high weight molecular compounds in the light of ease of realization of the foregoing dependence of birefringence difference on wavelength, photoelastic coefficient, controllability of the difference in refractive index from the adhesive layer with which the oriented films are laminated, etc.

The oriented film the dependence of the birefringence differences $\Delta n_1$ and $\Delta n_2$ of which on wavelength satisfies the relationship $\Delta n_1/\Delta n_2 < 1.05$ based on light having wavelength of 400 nm ($\Delta n_1$) and 550 nm ($\Delta n_2$) can be obtained by controlling the orientation conditions or the like. In order to prevent the ½ wavelength plate or ¼ wavelength plate from departing from their desired retardation properties, i.e., showing undesirable retardation in a specific wavelength range, particularly short wavelength range, the foregoing value of $\Delta n_1/\Delta n_2$ is preferably from 0.95 to 1.04, more preferably from 0.97 to 1.03, particularly from 0.98 to 1.02.

Further, in the light of satisfaction of the desired dependence of birefringence difference on wavelength, reduction of deviation of retardation from desired value in a specific wavelength range, prevention of coloring due to change of viewing angle, etc., an oriented film satisfying the relationship $0 \leq Nz \leq 1$ is preferably used wherein Nz is $(n_x - n_z)/(n_x - n_y)$ in which $n_x$ is the maximum in-plane refractive index, $n_y$ is the refractive index perpendicular to $n_x$ and $n_z$ is the vertical refractive index. Accordingly, the foregoing relationship means $n_y \leq n_z \leq n_x$. If it is necessary to control the vertical refractive index of an oriented film, a high molecular film may be oriented while a heat-shrinkable film is being bonded thereto.

Figure 3:
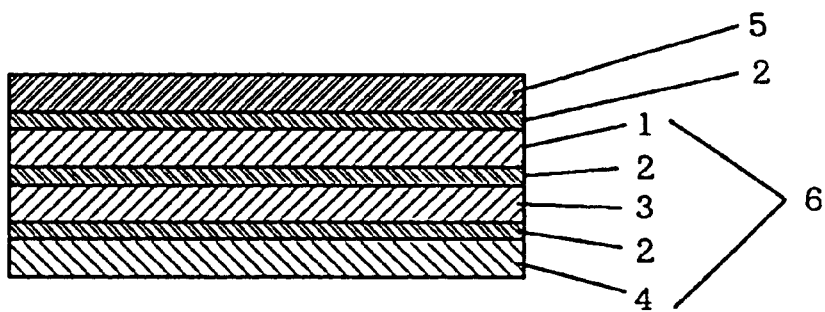
FIG. 3 is a sectional view illustrating an example of circular polarizing plate.

The circular polarizing plate according to the present invention is a laminate of the foregoing laminated wavelength plate having a ¼ wavelength plate and a polarizing plate. An example of this circular polarizing plate is shown in FIG. 3. Shown at the reference numerals 2, 5 and 6 are a transparent adhesive layer, a polarizing plate and a laminated wavelength plate, respectively. The circular polarizing plate can be formed by laminating the polarizing plate 5 with the laminated wavelength plate 6 at the foregoing laminating angle. During this process, the direction of the transmission axis of the polarizing plate can be changed by 90 degrees to change the direction of circular polarization (clockwise or counterclockwise circular polarization).

The circular polarizing plate can be formed by any proper polarizing plate. The polarizing plate employable herein is not specifically limited. In practice, however, a polarizing plate obtained by a process which comprises allowing a film of a high molecular weight compound such as polyvinyl alcohol-based or partially-formalated polyvinyl alcohol-based compound and ethylene-vinyl acetate copolymer-based partially-saponified compound to adsorb iodine and/or two-tone dye, and then orienting the film or a polarizing film made of an oriented polyene film such as dehydration product of polyvinyl alcohol and dehydrochlorination product of polyvinyl chloride may be used.

The thickness of the polarizing film is normally from 5 to 80 μm but is not limited thereto. The polarizing plate may comprise a polarizing film coated with a transparent protective layer or the like on one or both sides thereof. Such a transparent protective layer may have various purposes such as reinforcing the polarizing film, improving the heat resistance of the polarizing film and protecting the polarizing film against moisture or the like. The transparent protective layer may be formed as a resin coating layer or resin film laminating film. It may also comprise a particulate material for dispersion or surface roughening incorporated therein.

The circular polarizing plate preferably comprises one or both of an anti-reflection layer and a glare protection layer provided on one or both sides thereof for the purpose of preventing surface reflection or like purposes. The anti-reflection layer may be properly formed as a coherent layer such as fluorine-based polymer coating layer and multi-layer evaporated metal layer.

The glare protection layer may be formed by any proper method which allows the surface of the circular polarizing plate to scatter reflected light. Examples of such a method include a method which comprises spraying and fixing a particulate material with a binder onto the surface of the circular polarizing plate, a method which comprises embossing, sandblasting or etching the surface of the circular polarizing plate to provide the surface of the circular polarizing plate with a fine unevenness, a method which comprises coating the surface of the circular polarizing plate with a transparent resin containing a particulate material to provide the surface of the circular polarizing plate with a fine unevenness, and a combination thereof.

Examples of the foregoing particulate material include finely divided grains of inorganic material which may be electrically conductive such as silica, calcium oxide, alumina, titania, zirconia, tin oxide, indium oxide, cadmium oxide and antimony oxide having an average grain diameter of from 0.5 to 20 μm, and finely divided grains of crosslinked or uncrosslinked organic material made of proper polymer such as polymethyl methacrylate and polyurethane. These particulate materials may be used singly or in combination of two or more thereof.

The various layers constituting the laminated wavelength plate or circular polarizing plate such as oriented film and polarizing plate may be disposed separately from each other. However, some or whole of these layers may be fixed to each other to inhibit reflection by adjusting the interlayer refractive index, inhibit deviation in the optical system or inhibit the contamination by foreign matters such as dust. Fixing may be carried out by the use of a proper material such as transparent adhesive. The kind of the adhesive to be used is not specifically limited. Taking into account the requirement that the constituent members should undergo no change in optical properties, an adhesive which requires neither high temperature process during curing or drying in the bonding step nor prolonged period of time for curing or drying is desirable. From this standpoint of view, an adhesive layer is preferably used.

The transparent adhesive layer may be formed by any proper polymer such as acrylic polymer, silicone-based polymer, polyester, polyurethane, polyether and synthetic rubber. Particularly preferred among these polymers is acrylic adhesive in the light of optical transparency, adhesiveness, weathering resistance, etc.

In the light of inhibition of reflection at the interface of layers or the like, the adhesive layer which is preferably used herein exhibits a refractive index which differs from that of the object to which it is bonded such as oriented film by not more than 0.1, preferably not more than 0.08, particularly not more than 0.06. The adjustment of the refractive index of the adhesive layer can be carried out by selecting the kind of the base polymer used or blending a refractive index modifier. As such a refractive index modifier there may be used any proper material such as polymer having a higher or lower refractive index than the base polymer.

Further, the adhesive layer is preferably used also because its viscoelasticity can relax internal stress developed in the laminate due to heat to exert an excellent effect of inhibiting photoelastic deformation. The adhesive layer which is preferably used particularly for the purpose of inhibiting photoelastic deformation should exert an excellent effect of relaxing stress. In particular, an adhesive layer having a relaxation elasticity of from $2 \times 10^5$ to $1 \times 10^7$ dyne/cm², particularly from $2 \times 10^6$ to $8 \times 10^6$ dyne/cm², is desirable. The adhesive layer to be optionally provided for the purpose of bonding an adherend such as liquid crystal cell to one or both surfaces of the laminated wavelength plate or circular polarizing plate is preferably such an adhesive layer for the foregoing reasons.

The laminated wavelength plate or circular polarizing plate as ½ wavelength plate or ¼ wavelength plate of the present invention can be used for various purposes such as anti-reflection filter, glare protection filter and liquid crystal projector. In general, a liquid crystal display device is formed, e.g., by properly assembling a polarizing plate, a liquid crystal cell, and optionally a back light, a reflector, a phase difference compensator, etc., and then incorporating a driving circuit into the assembly. In the present invention, the method of forming a liquid crystal display device is not specifically limited except that the foregoing laminated wavelength plate or circular polarizing plate is used. Thus, a liquid crystal display device can be formed according to any conventional methods.

In this respect, the circular polarizing plate acts as a circular polarization forming plate which emits circularly polarized light from the laminated wavelength plate as mentioned above when natural light enters the device on the polarizing plate side but acts as a linear polarization forming plate which linearly polarizes circularly polarized light which has entered the device on the laminated wavelength plate side to generate linearly polarized light which then enters the polarizing plate. Accordingly, the circular polarizing plate according to the present invention can be applied to a liquid crystal display as the foregoing circular polarization forming plate or linear polarization forming plate.

The former function as circular polarization forming plate is useful as anti-reflection filter for inhibiting the surface reflection of liquid crystal display or the like. The latter function as linear polarization forming plate, if used in combination with a back light provided with a circular polarization forming plate made of cholesteric liquid crystal or the like, is useful for the formation of a system for enhancing the brightness of liquid crystal display device. In the formation of such a liquid crystal display device, any proper optical elements may be provided such as light diffuser, anti-glare layer, prism sheet, anti-reflection layer, protective layer and protective plate provided on the polarizing plate on the viewing side, retardation compensator provided between the liquid crystal cell and the polarizing plate on the viewing side and/or back light side and prism sheet and other light path controllers provided on the back light.

The various parts constituting the laminated wavelength plate, circular polarizing plate or liquid crystal display according to the present invention such as oriented film, polarizing plate, adhesive layer, light diffuser and retardation compensator may be provided with ultraviolet absorbing properties as provided by treatment with an ultraviolet absorbing agent such as salicylic acid ester-based compound, benzophenol-based compound, benzotriazole-based compound, cyanoacrylate-based compound and nickel complex salt-based compound. Further, the liquid crystal display according to the present invention preferably have various constituent parts integrally fixed with an adhesive layer provided interposed therebetween.

The present invention will be further described in the following examples, but the present invention should not be construed as being limited thereto.

Reference Example 1

A cyclic polyolefin film (hereinafter "ARTON", produced by JSR) having a refractive index of 1.51 and a thickness of 100 $\mu$m was subjected to 50% orientation at a temperature of 175° C. Thus, a $\lambda/2$ oriented film having $\Delta n_1/\Delta n_2$ of 1.025 and Nz of 1 which gives a retardation of ½ wavelength with respect to light having a wavelength of 550 nm based on birefringent light was obtained.

Reference Example 2

A cyclic polyolefin film having a refractive index of 1.51 and a thickness of 100 $\mu$m was subjected to 25% orientation at a temperature of 175° C. Thus, a $\lambda/4$ oriented film having $\Delta n_1/\Delta n_2$ of 1.025 and Nz of 1 which gives a retardation of ¼ wavelength with respect to light having a wavelength of 550 nm based on birefringent light was obtained.

Reference Example 3

A polycarbonate film having a refractive index of 1.59 and a thickness of 50 $\mu$m was subjected to 5% orientation at a temperature of 150° C. Thus, a $\lambda/2$ oriented film having $\lambda n_1/\Delta n_2$ of 1.16 and Nz of 1 which gives a retardation of ½ wavelength with respect to light having a wavelength of 550 nm based on birefringent light was obtained.

Reference Example 4

A polycarbonate film having a refractive index of 1.59 and a thickness of 50 $\mu$m was subjected to 2.5% orientation at a temperature of 150° C. Thus, a $\lambda/4$ oriented film having $\Delta n_1/\Delta n_2$ of 1.16 and Nz of 1 which gives a retardation of ¼ wavelength with respect to light having a wavelength of 550 nm based on birefringent light was obtained.

EXAMPLE 1

Two sheets of the $\lambda/2$ oriented films obtained in Reference Example 1 were laminated with their optical axes (orientation axes) crossing each other at an angle of 45 degrees and an acrylic adhesive having a refractive index of 1.47 provided interposed therebetween to obtain a ½ wavelength plate according to the present invention.

EXAMPLE 2

A sheet of the $\lambda/2$ oriented film obtained in Reference Example 1 and a sheet of the $\lambda/4$ oriented film obtained in Reference Example 2 were laminated with their optical axes crossing each other at an angle of 62.5 degrees and an acrylic adhesive having a refractive index of 1.47 provided interposed therebetween to obtain a ¼ wavelength plate according to the present invention. A polarizing film (NPF-HEG1425DUAG30, produced by NITTO DENKO CORP.) was then laminated on the ¼ wavelength plate thus obtained with the optical axis of the $\lambda/4$ oriented film and the transmission axis of the polarizing film crossing each other at an angle of 80 degrees and the foregoing acrylic adhesive provided interposed therebetween to obtain a circular polarizing plate according to the present invention.

Comparative Example 1

A ½ wavelength plate was obtained in the same manner as in Example 1 except that the $\lambda/2$ oriented film obtained in Reference Example 3 was used.

Comparative Example 2

A circular polarizing plate was obtained in the same manner as in Example 2 except that the $\lambda/2$ oriented film and $\lambda/4$ oriented film obtained in Reference Examples 3 and 4 were used.

Comparative Example 3

A circular polarizing plate was obtained in the same manner as in Example 2 except that the λ/2 oriented film and λ/4 oriented film obtained in Reference Examples 1 and 4 were used.

Evaluation test

Wide band properties of ½ wavelength plate:

The ½ wavelength plates obtained in Example 1 and Comparative Example 1 were each disposed between polarizing plates which were arranged in a cross Nicol fashion. Under these conditions, these ½ wavelength plates were examined for spectrum in transmission mode. The ½ wavelength plate was disposed in such an arrangement that the optical axis of two sheets of λ/2 oriented films were 22.5 degrees and 67.5 degrees, respectively, with respect to the transmission axis of the polarizing plate on the incoming side.

Figure 4:
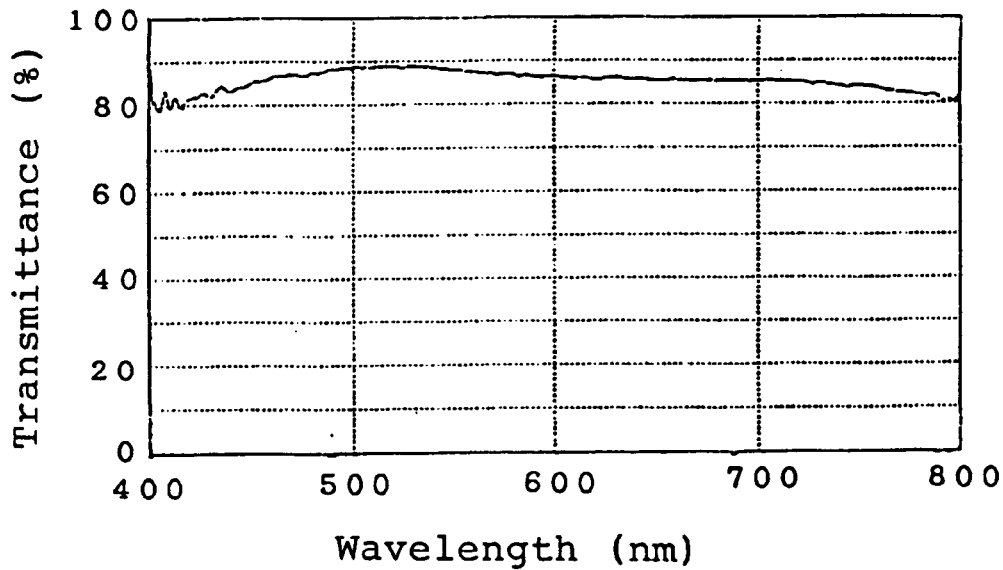
FIG. 4 is a graph showing the spectrum of Example 1.
Figure 5:
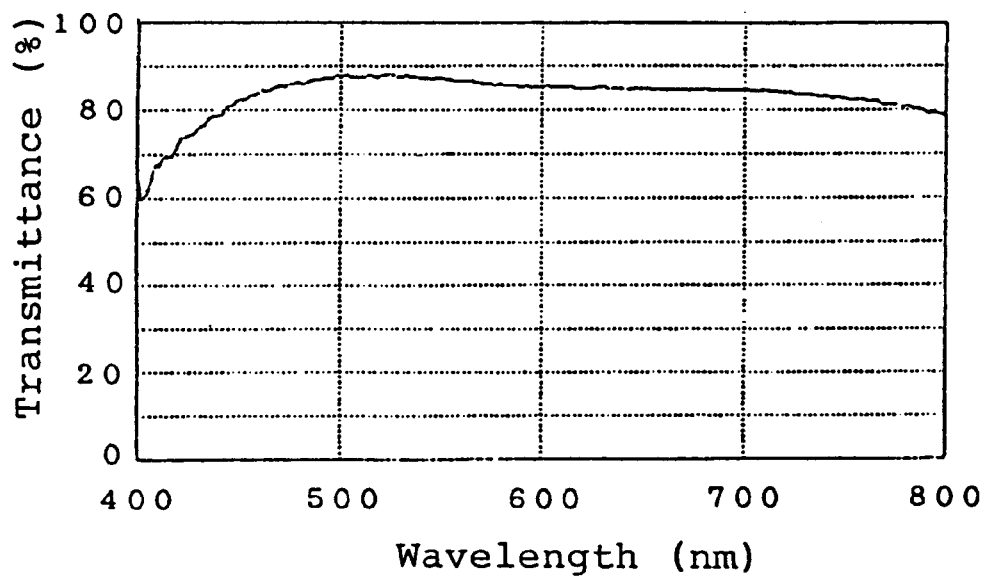
FIG. 5 is a graph showing the spectrum of Comparative Example 1.

The results are shown in FIG. 4 (Example 1) and FIG. 5 (Comparative Example 1). These results show that Example 1 gives almost flat retardation properties and high transmittance values over a wavelength range as wide as from 400 to 700 nm while Comparative Example 1 exhibits low transmittance values at a wavelength as short as from 400 to 450 nm.

Figure 6:
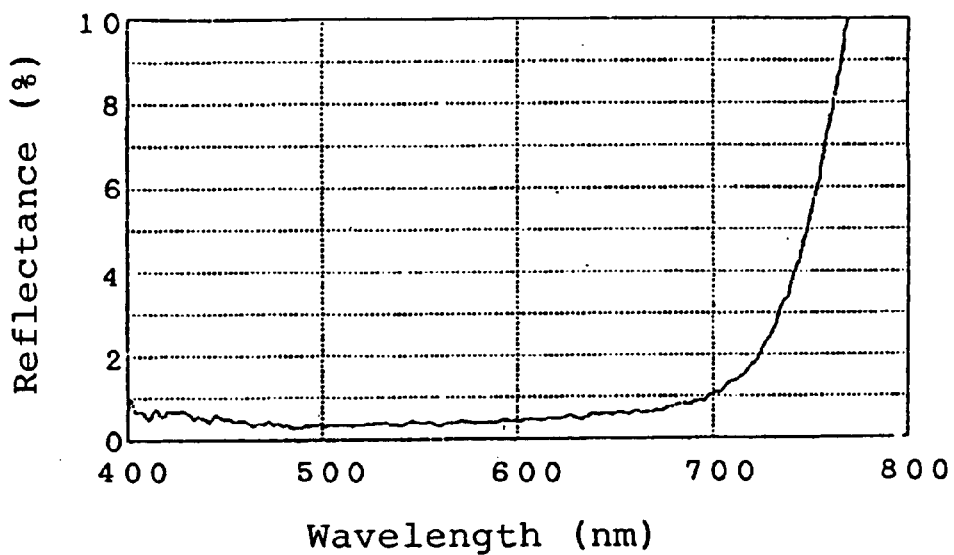
FIG. 6 is a graph showing the spectrum of Example 2.
Figure 7:
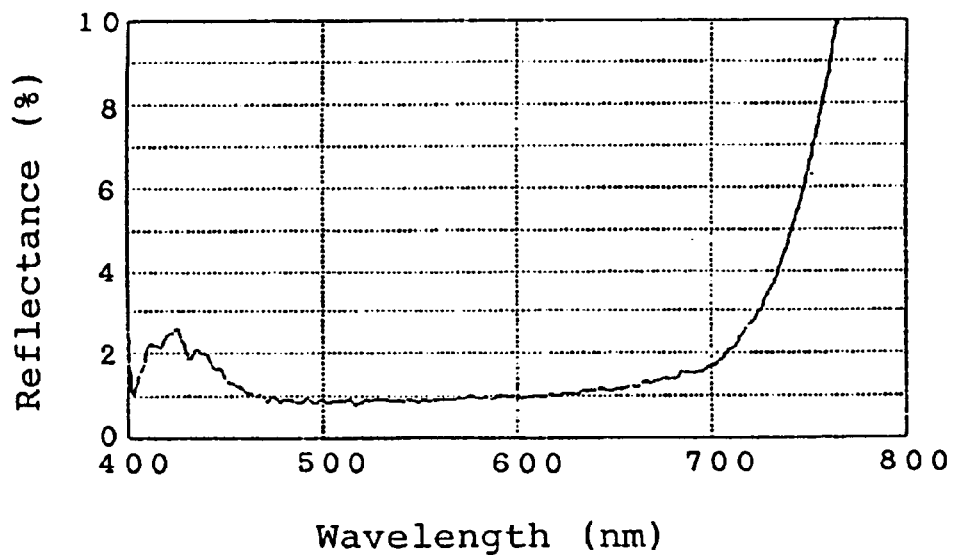
FIG. 7 is a graph showing the spectrum of Comparative Example 2.

Wide band properties of anti-reflection effect:

The circular polarizing plates obtained in Example 2 and Comparative Example 2 were placed on a mirror. Under these conditions, these circular polarizing plates were examined for spectrum in reflection mode. The results are shown in FIG. 6 (Example 2) and FIG. 7 (Comparative Example 2). These results show that Example 2 exhibits a good light shielding effect and hence almost flat properties over a wavelength range as wide as from 400 to 700 nm while Comparative Example 2 shows a peak reflectance value in the vicinity of 430 nm, demonstrating that a bluish light is leaked, and high reflectance values as a whole due to reflection at the interface of the adhesive layer. Heat resistance of circular polarizing plate:

The circular polarizing plates obtained in Example 2 and Comparative Examples 2 and 3 were bonded to a glass plate with an acrylic adhesive layer provided interposed therebetween. The laminate was then heated to a temperature of 70° C. The laminate was then placed on a reflector and examined for coloring and color unevenness (color uniformity) of reflected light while being kept at the same temperature.

The results are set forth in the table below.

|  | Example 2 | Comparative Example 2 | Comparative Example 3 |
| --- | --- | --- | --- |
| Coloring | None | Observed | Observed |
| Color unevenness | None | Observed | Observed |

While the invention has been described in detail and with reference to specific embodiments thereof, it will be apparent to one skilled in the art that various changes and modifications can be made therein without departing from the spirit and scope thereof.

What is claimed is:

1. A laminated wavelength plate comprising a plurality of oriented films giving a retardation having a wavelength half that of monochromatic light laminated with their optical axes crossing each other, wherein dependence of birefringence differences $\Delta n_1$ and $\Delta n_2$ of said oriented films on wavelength each satisfy a relationship $\Delta n_1/\Delta n_2 < 1.05$ based on light having wavelength of 400 nm ($\Delta n_1$) and 550 nm ($\Delta n_2$).

2. A laminated wavelength plate comprising a plurality of oriented films laminated with their optical axes crossing each other, dependence of birefringence differences $\Delta n_1$ and $\Delta n_2$ of said oriented films on wavelength each satisfying a relationship $\Delta n_1/\Delta n_2 < 1.05$ based on light having wavelength of 400 nm ($\Delta n_1$) and 550 nm ($\Delta n_2$), wherein said oriented films used are those giving a phase difference of ½ wavelength with respect to monochromatic light and those giving a retardation of ¼ wavelength with respect to monochromatic light in combination.

3. The laminated wavelength plate as claimed in claim 1, comprising an oriented film satisfying the relationship $0 \leq (n_x - n_z)/(n_x - n_y) \leq 1$ wherein $n_x$, $n_y$ and $n_z$ are the maximum in-plane refractive index, the refractive index in the direction perpendicular to the direction in which the maximum in-plane refractive index occurs and the vertical refractive index, respectively.

4. The laminated wavelength plate as claimed in claim 1, wherein said oriented films are bonded to each other with an adhesive layer having a refractive index difference of not more than 0.1 from that of said oriented films provided interposed therebetween.

5. A circular polarizing plate comprising a laminate of a laminated wavelength plate having a ¼ wavelength plate and a polarizing plate, the ¼ wavelength plate comprising a plurality of oriented films giving a retardation having a wavelength half that of monochromatic light laminated with their optical axes crossing each other, wherein dependence of birefringence differences $\Delta n_1$ and $\Delta n_2$ of said oriented films on wavelength each satisfy a relationship $\Delta n_1/\Delta n_2 < 1.05$ based on light having wavelength of 400 nm ($\Delta n_1$) and 550 nm ($\Delta n_2$).

6. The circular polarizing plate as claimed in claim 5, further comprising either or both of an anti-reflection layer and a glare protection layer.

7. A liquid crystal display comprising a circular polarizing plate and either or both of an anti-reflection layer and a glare protection layer, the circular polarizing plate comprising a laminate of a laminated wavelength plate having a ¼ wavelength plate and a polarizing plate, the ¼ wavelength plate comprising a plurality of oriented films giving a retardation having a wavelength half that of monochromatic light laminated with their optical axes crossing each other, wherein dependence of birefringence differences $\Delta n_1$ and $\Delta n_2$ of said oriented films on wavelength each satisfy a relationship $\Delta n_1/\Delta n_2 < 1.05$ based on light having wavelength of 400 nm ($\Delta n_1$) and 550 nm ($\Delta n_2$).

8. The laminated wavelength plate as claimed in claim 2, comprising an oriented film satisfying the relationship $0 \leq (n_x - n_z)/(n_x - n_y) \leq 1$ wherein $n_x$, $n_y$ and $n_x$ are the maximum in-plane refractive index, the refractive index in the direction perpendicular to the direction in which the maximum in-plane refractive index occurs and the vertical refractive index, respectively.

9. The laminated wavelength plate as claimed in claim 2, wherein said oriented films are bonded to each other with an adhesive layer having a refractive index difference of not more than 0.1 from that of said oriented films provided interposed therebetween.

10. A circular polarizing plate comprising a laminate of a laminated wavelength plate having a ¼ wavelength plate and a polarizing plate, the ¼ wavelength plate comprising a plurality of oriented films laminated with their optical axes crossing each other, dependence of birefringence differences $\Delta n_1$ and $\Delta n_2$ of said oriented films on wavelength each satisfy a relationship $\Delta n_1/\Delta n_2 < 1.05$ based on light having wavelength of 400 nm ($\Delta n_1$) and 550 nm ($\Delta n_2$), wherein said oriented films used are those giving a phase difference of ½ wavelength with respect to monochromatic light and those giving a retardation of ¼ wavelength with respect to monochromatic light in combination.

11. The circular polarizing plate as claimed in claim 10, further comprising either or both of an anti-reflection layer and a glare protection layer.

12. A liquid crystal display comprising a circular polarizing plate and either or both of an anti-reflection layer and a glare protection layer, said circular polarizing plate comprising a laminate of a laminated wavelength plate having a ¼ wavelength plate and a polarizing plate, the ¼ wavelength plate comprising a plurality of oriented films laminated with their optical axes crossing each other, the dependence of birefringence differences $\Delta n_1$ and $\Delta n_2$ of said oriented films on wavelength each satisfy a relationship $\Delta n_1/\Delta n_2 < 1.05$ based on light having wavelength of 400 nm ($\Delta n_1$) and 550 nm ($\Delta n_2$), wherein said oriented films used are those giving a phase difference of ½ wavelength with respect to monochromatic light and those giving a retardation of ¼ wavelength with respect to monochromatic light in combination.

13. A laminated wavelength plate as recited in claim 1, wherein said relationship of $\Delta n_1/\Delta n_2$ lies within a range of between 0.94 and 1.04.

* * * * *